US012718227B2

(12) United States Patent
Malmborg et al.

(10) Patent No.: US 12,718,227 B2
(45) **Date of Patent: *Aug. 25, 2026**

(54) METHOD FOR PREVENTING THE MISUSE OF ELECTRONIC ACCESS PERMISSIONS, WHICH CAN BE MANAGED IN MOBILE ELECTRONIC DEVICES USING A WALLET APPLICATION AND WHICH ARE TRANSMITTED TO THE MOBILE ELECTRONIC DEVICES BY A SERVER, IN EACH CASE USING A LINK FOR DOWNLOADING THE ACCESS PERMISSION

(71) Applicant: SKIDATA GMBH, Grödig/Salzburg (AT)

(72) Inventors: Anders Malmborg, Salzburg (AT); Vaijayanthi Mala Jayaprakash, Bangalore (IN)

(73) Assignee: SKIDATA GMBH, Grödig/Salzburg (AT)

( * ) Notice: Subject to any disclaimer, the term of this patent is extended or adjusted under 35 U.S.C. 154(b) by 62 days.

This patent is subject to a terminal disclaimer.

(21) Appl. No.: 18/738,495

(22) Filed: Jun. 10, 2024

(65) Prior Publication Data

US 2025/0021964 A1 Jan. 16, 2025

Related U.S. Application Data

(63) Continuation-in-part of application No. 18/343,436, filed on Jun. 28, 2023, now Pat. No. 12,008,546, (Continued)

(30) Foreign Application Priority Data

Aug. 7, 2017 (EP) .................................... 17185122

(51) Int. Cl.
*G06Q 20/32* (2012.01)
*G06F 16/23* (2019.01)
(Continued)

(52) U.S. Cl.
CPC ......... *G06Q 20/363* (2013.01); *G06Q 20/322* (2013.01); *G06Q 20/351* (2013.01);
(Continued)

(58) Field of Classification Search
CPC ............... G06Q 20/363; G06Q 20/351; G06Q 20/4016; G06Q 20/401; G06Q 20/3674;
(Continued)

(56) References Cited

U.S. PATENT DOCUMENTS

| | | | |
|---|---|---|---|
| 8,577,053 | B1 | 11/2013 | Simon |
| 9,147,092 | B2 | 9/2015 | Jeng et al. |

(Continued)

FOREIGN PATENT DOCUMENTS

| | | | |
|---|---|---|---|
| CL | 2018002087 | A1 | 11/2018 |
| CN | 104579682 | A | 4/2015 |

(Continued)

OTHER PUBLICATIONS

European Search Report issued in corresponding European Patent Application No. 17185122.3 dated Feb. 9, 2018.

*Primary Examiner* — Jessica Lemieux
*Assistant Examiner* — Douglas W Pinsky
(74) *Attorney, Agent, or Firm* — Secant IP, P.L.L.C.

(57) ABSTRACT

A method for preventing misuse of electronic access permissions, managed in mobile electronic devices using a wallet application and transmitted by a server. A link is purchased from the server, during which a password or authentication data and a mobile electronic device, are specified via the link. When activating the link, an ID of the first mobile electronic device, which is associated with an ID
(Continued)

of the purchased access permission, is transmitted to the server. The electronic access permission is only transferable from the first mobile electronic device to another mobile electronic device after the password is first entered with the server. Upon transfer, in the server the access permission ID is associated with the ID of the other mobile electronic device and the access permission stored on the first mobile electronic device is marked as invalid.

20 Claims, 1 Drawing Sheet

Related U.S. Application Data which is a continuation of application No. 16/040,628, filed on Jul. 20, 2018, now abandoned.

(51) Int. Cl.

| | |
|---|---|
| ***G06Q 20/10*** | (2012.01) |
| ***G06Q 20/34*** | (2012.01) |
| ***G06Q 20/36*** | (2012.01) |
| ***G06Q 20/38*** | (2012.01) |
| ***G06Q 20/40*** | (2012.01) |
| ***G06Q 40/06*** | (2012.01) |
| ***H04L 29/06*** | (2006.01) |
| ***H04W 12/06*** | (2021.01) |
| ***H04W 12/08*** | (2021.01) |
| *G06F 21/31* | (2013.01) |
| *G06F 21/32* | (2013.01) |
| *G06F 21/45* | (2013.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(52) U.S. Cl.

CPC ....... *G06Q 20/3674* (2013.01); *G06Q 20/401* (2013.01); *G06Q 20/4014* (2013.01); *G06Q 20/4016* (2013.01); *H04W 12/06* (2013.01); *H04W 12/08* (2013.01); *H04L 2463/102* (2013.01)

(58) Field of Classification Search

CPC ............. G06Q 20/322; G06Q 20/4014; G06Q 20/382; H04W 12/08; H04W 12/06; H04L 2463/102; G06F 21/6209; G06F 21/51; G06F 21/46; G06F 21/44

See application file for complete search history.

(56) References Cited

U.S. PATENT DOCUMENTS

| | | | | |
|---|---|---|---|---|
| 9,785,764 | B2 * | 10/2017 | Loughlin-Mchugh ...................... | G06F 21/35 |
| 9,967,253 | B2 | 5/2018 | Tamura | |
| 2001/0032312 | A1 * | 10/2001 | Runje .................. | H04L 63/126 705/52 |
| 2002/0116343 | A1 | 8/2002 | Nakamura et al. | |
| 2003/0149662 | A1 * | 8/2003 | Shore .................. | G06Q 20/045 705/39 |
| 2006/0212405 | A1 * | 9/2006 | Gordon .................. | G06F 21/10 705/59 |
| 2007/0276944 | A1 * | 11/2007 | Samovar .................. | G07C 9/27 709/225 |
| 2009/0138973 | A1 * | 5/2009 | Courtay .................. | G06F 21/10 726/26 |
| 2013/0238372 | A1 * | 9/2013 | Jordan .................. | G07B 15/00 705/5 |
| 2014/0136248 | A1 | 5/2014 | Matarazzi et al. | |
| 2014/0195276 | A1 * | 7/2014 | Tacchi .................. | G06Q 10/02 705/5 |
| 2015/0339599 | A1 | 11/2015 | Lee et al. | |
| 2016/0171497 | A1 * | 6/2016 | Kerschbaumer ..... | G06Q 20/405 705/44 |
| 2016/0350547 | A1 * | 12/2016 | Loughlin-Mchugh ...................... | H04L 67/306 |
| 2016/0350861 | A1 | 12/2016 | Loughlin-Mchugh et al. | |
| 2017/0116693 | A1 * | 4/2017 | Rae ...................... | G06Q 50/184 |
| 2018/0018595 | A1 * | 1/2018 | Scott .................. | G06Q 20/0457 |
| 2018/0260539 | A1 * | 9/2018 | Puri ...................... | G06F 21/44 |
| 2018/0322259 | A1 * | 11/2018 | Solow .................. | H04L 9/0819 |
| 2019/0042775 | A1 | 2/2019 | Harasek et al. | |

FOREIGN PATENT DOCUMENTS

| | | | | |
|---|---|---|---|---|
| JP | 2015228067 | A | 12/2015 | |
| KR | 100822701 | B1 | 4/2008 | |
| KR | 20110002199 | A | 1/2011 | |
| KR | 20150109659 | A | 10/2015 | |
| RU | 2011133532 | A | 2/2013 | |
| TW | 201349144 | A | 12/2013 | |
| TW | 201401199 | A | 1/2014 | |
| WO | 2016193156 | A1 | 12/2016 | |
| WO | WO-2018142587 | A1 * | 8/2018 | ............ G06Q 20/04 |

* cited by examiner

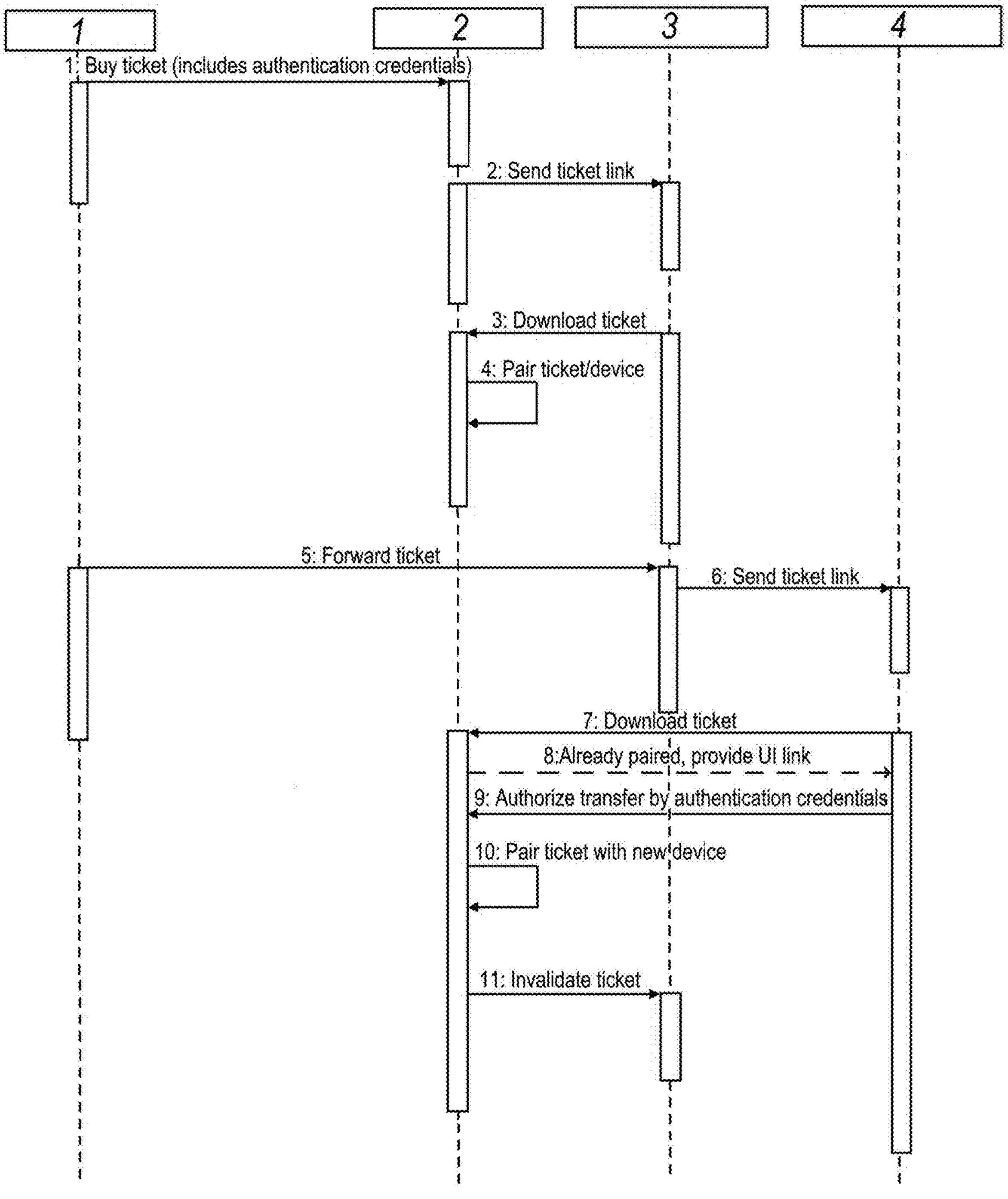
1
2
3
4
1: Buy ticket (includes authentication credentials)
2: Send ticket link
3: Download ticket
4: Pair ticket/device
5: Forward ticket
6: Send ticket link
7: Download ticket
8:Already paired, provide UI link
9: Authorize transfer by authentication credentials
10: Pair ticket with new device
11: Invalidate ticket

METHOD FOR PREVENTING THE MISUSE OF ELECTRONIC ACCESS PERMISSIONS, WHICH CAN BE MANAGED IN MOBILE ELECTRONIC DEVICES USING A WALLET APPLICATION AND WHICH ARE TRANSMITTED TO THE MOBILE ELECTRONIC DEVICES BY A SERVER, IN EACH CASE USING A LINK FOR DOWNLOADING THE ACCESS PERMISSION

This application is a continuation-in-part of application Ser. No. 18/343,436 filed Jun. 28, 2023, which is a continuation of application Ser. No. 16/040,628 filed Jul. 20, 2018, which claims priority from European patent application serial no. 17185122.3 filed Aug. 7, 2017.

FIELD OF THE INVENTION

The present invention relates to a method for preventing the misuse of electronic access permissions, which can be managed in mobile electronic devices using a wallet application and which are transmitted to the mobile electronic devices by a server, in each case using a link for downloading the access permission.

BACKGROUND OF THE INVENTION

From the prior art it is known to store and manage electronic access permissions, for example by means of so-called wallet applications on mobile electronic devices, such as smartphones and tablets. In this case it is possible, for example, by means of the IOS "Wallet" app, to forward electronic access permissions to other mobile electronic devices. This increases the convenience for the user, in the case where an authorized person would like to use a new mobile electronic device; on the other hand, this technique can allow personal electronic access permissions to be "borrowed", thereby allowing a misuse of these access permissions.

SUMMARY OF THE INVENTION

The object of the present invention is to specify a method for preventing the misuse of electronic access permissions, which can be managed in mobile electronic devices using a wallet application and which are transmitted to the mobile electronic devices by a server, in each case using a link for downloading the access permission, the use of which excludes the possibility of misuse of the access permission while at the same time ensuring the facility for transmitting the electronic access permission to another mobile electronic device of an authorized person.

This object is achieved by the features of the independent claim(s). Further configurations according to the invention and advantages are apparent from the dependent claims.

Consequently, a method is proposed for preventing the misuse of electronic access permissions, which can be managed in mobile electronic devices using a wallet application and which transmitted to the mobile electronic devices by a server, in each case using a link for downloading the access permission, wherein in said method an electronic access permission is purchased by means of an interaction with a server, wherein during the purchase of the electronic access permission by a buyer, a password or authentication data and a mobile electronic device are specified, the electronic access permission is transmitted from the server to the mobile electronic device by means of a link for downloading the access permission.

According to the invention, in implementing the link for downloading the purchased access permission a unique ID of the mobile electronic device is transmitted to the server, which is associated with an ID of the acquired access permission, wherein a transmission of the electronic access permission from the first mobile electronic device to another mobile electronic device takes place only after the input of the password specified by the purchaser of the access permission, and/or input of the authentication data specified by the buyer of the access permission by means of an interaction with the server, wherein on completion of the transfer the access permission ID is associated with the ID of the other mobile electronic device in the server, and the server marks the access permission stored on the first mobile electronic device as invalid.

In the context of one design of the invention, after the transmission of the link for downloading the access permission to the mobile electronic device, a wallet application installed on the mobile device activates the link and in order to download the acquired access permission a unique ID of the mobile electronic device is transmitted to the server, wherein it is verified in the server whether an ID of the acquired access permission is associated with the transmitted unique ID of the mobile electronic device, wherein if this is not the case, the access permission ID and the unique ID of the mobile electronic device are associated with each other and the electronic access permission is then downloaded.

In the event that the electronic access permission is to be transferred from one mobile electronic device to another mobile electronic device, the wallet application of the mobile electronic device, whose unique ID is associated with the access permission ID, transmits a link for downloading the access permission to the other mobile electronic device, wherein the wallet application of the other mobile electronic device activates the link and transmits a unique ID of the other mobile electronic device to the server.

According to the invention, it is verified in the server whether an association of the access permission ID with a unique ID of another mobile electronic device exists, wherein if this is the case, the server sends a link to the other mobile electronic device, the activation of which by the wallet application leads to an input screen for either the password specified by the purchaser of the access permission or for the authentication data specified by the purchaser of the access permission, wherein if the password is valid or the authentication data are valid, the access permission ID is associated with the ID of the other mobile electronic device in the server and the electronic access permission is downloaded to the other mobile electronic device.

Then, the access permission stored on the first mobile electronic device is marked by the server as invalid, preferably by means of a push message to the wallet application, wherein the association of the ID of the first mobile electronic device with the electronic access permission is deleted and the corresponding data are stored on the server.

The design according to the invention provides a method for preventing the misuse of electronic access permissions, which can be managed in mobile electronic devices using a wallet application and which are transmitted to the mobile electronic devices by a server, in each case using a link for downloading the access permission, the activation of which ensures that an access permission can only be transferred to another mobile electronic device if this is a mobile electronic device of an authorized person.

In the context of an extension of the invention, if an access permission is to be transferred from one mobile electronic device to another mobile electronic device, i.e. if the access permission ID has already been associated with a unique ID of a mobile electronic device, then on the basis of the number of the completed associations from the access permission ID to unique IDs of mobile electronic devices it is verified how often the access permission has already been transferred, wherein if the number of completed transfers has reached a predefined threshold value, no further transfer is possible.

BRIEF DESCRIPTION OF THE DRAWING

In the following, an example of the invention is described in greater detail on the basis of the attached FIGURE, which shows a sequence diagram to illustrate the main features of the method according to the invention.

DETAILED DESCRIPTION OF THE PREFERRED EMBODIMENTS

Referring to the attached FIGURE, at the start of the method an electronic access permission is purchased by a buyer 1 by means of an interaction with a server 2 (step 1), wherein when the electronic access permission is purchased by the buyer a password or authentication data is specified. Then (step 2), the electronic access permission is transferred from the server 1 to a mobile electronic device 3 specified during the purchase of the access permission, by means of a link for downloading the access permission, wherein a wallet application installed on the mobile device 3 activates the link and in order to download the acquired access permission, a unique ID of the mobile electronic device is transmitted to the server 2 (step 3), wherein it is verified in the server 2 whether an ID of the acquired access permission is associated with the transmitted unique ID of the mobile electronic device 3, wherein if this is not the case, the access permission ID and the unique ID of the mobile electronic device 3 are associated with each other (step 4) and the electronic access permission is then downloaded.

If the electronic access permission is to be transferred from one mobile electronic device 3 to another mobile electronic device 4, i.e., if the access permission ID has already been associated with a unique ID of a mobile electronic device 3, then after initiation of the process by the owner of the mobile electronic device 3 (step 5) with whose unique ID the access permission ID is associated, the wallet application of the mobile electronic device 3, with whose unique ID the access permission ID is associated, transmits a link for downloading the access permission to the other mobile electronic device 4 (step 6), wherein the wallet application of the other mobile electronic device 4 activates the link (step 7) and transmits a unique ID of the other mobile electronic device 4 to the server 2.

It is then verified in the server 2 whether an association of the access permission ID with a unique ID of another mobile electronic device exists, wherein if this is the case, the server 2 sends a link to the other mobile electronic device 4 (step 8), the activation of which by the wallet application leads to an input screen for entering either the password specified by the purchaser of the access permission or for the authentication data specified by the purchaser of the access permission (step 9), wherein if the password is valid or the authentication data is valid, the access permission ID is associated with the ID of the other mobile electronic device

4 in the server 2 and the electronic access permission is downloaded to the other mobile electronic device 4 (step 10).

The access permission stored on the first mobile electronic device 3 is then marked by the server 2 as invalid (step 11), preferably by means of a push message to the wallet application.

The invention claimed is:

1. A method for preventing misuse of an electronic access permission, which is manageable with a mobile electronic device using a mobile device application, the electronic access permission being transmitted to the mobile electronic device by an access permission server controlling an initial creation of the electronic access permission as well as any subsequent transfer of the electronic access permission, the method comprising:

receiving at the access permission server, during the initial creation of the electronic access permission, a first mobile electronic device ID;

generating an ID associated with the electronic access permission;

associating the ID of the electronic access permission with the unique ID of the first mobile electronic device;

transmitting the electronic access permission to the first mobile electronic device for management in the mobile device application in response to associating the first mobile electronic device ID with the ID of the electronic access permission; and following transmission of the electronic access permission to the first mobile electronic device, processing a transfer request for transferring the electronic access permission from the first mobile electronic device to a second mobile electronic device, the processing comprising:

receiving, from the first mobile electronic device, first verification information associated at least with approval by the first mobile electronic device to transfer the electronic access permission;

receiving a request for the electronic access permission from the second mobile electronic device in response to the second mobile electronic device receiving the ID of the electronic access permission from the first mobile electronic device, wherein the request includes a unique ID of the second mobile electronic device;

verifying at the access permission server that the ID of the electronic access permission is associated with the unique ID of a mobile electronic device different than the second mobile electronic device;

requesting by the access permission server that the second mobile electronic device provide second verification information associated with transfer approval by the first mobile electronic device;

determining that the second verification information provided by the second mobile electronic device is validated in comparison to the first mobile electronic device;

in response to validating the second verification information from the second mobile electronic device, associating the ID of the electronic access permission with the unique ID of the second mobile electronic device;

transmitting the electronic access permission to the second mobile electronic device for management through a mobile device application of the second mobile electronic device; and invalidating the electronic access permission on the first mobile electronic device by means of a message from the access permission server to the first mobile electronic device and deleting on the access permission server, the association between the electronic access permission and the first mobile electronic device.

2. The method of claim 1, wherein the first verification information comprises one or more of a password or authentication data specified by a user of the first mobile electronic device during creation of the electronic access permission.

3. The method of claim 1, wherein the second verification information comprises information associated with the unique ID of the second mobile electronic device.

4. The method of claim 1, wherein the initial creation of the electronic access permission further comprises defining a maximum transmission threshold indicating the total permitted number of times that the electronic access permission may be transmitted to any mobile electronic device after initial creation.

5. The method of claim 4, wherein transmitting the electronic access permission to any mobile electronic device after initial creation further comprises increasing a transmission count in the access permission server.

6. The method of claim 5, wherein processing the transfer request further comprises the step of permitting transfer only if the transmission count has not already equaled the predefined maximum transmission threshold.

7. The method of claim 4, wherein transmitting the electronic access permission to any mobile electronic device further comprises appending the unique ID of the receiving mobile electronic device to a record of all mobile electronic device IDs receiving the electronic access permission since initial creation;

and wherein processing the transfer request further comprises the steps of determining from the record the number of times the electronic access permission has been transferred since initial creation and permitting transfer only if the determined count has not reached the maximum transmission threshold.

8. The method of claim 1, wherein the transmission of any mobile electronic device unique ID is via the mobile application of the mobile electronic device.

9. The method of claim 1, wherein the invalidation message from the access permission server is transmitted to the mobile device application of the first mobile electronic device.

10. The method of claim 1, wherein the access permission server sends a message to the mobile applications of the first and second mobile electronic devices indicating a result of the processing of the transfer request.

11. A method for preventing unauthorized use of electronic access permissions that can be managed in mobile electronic devices by means of mobile device applications, the electronic access permissions being transmitted to the mobile electronic devices from an access permission server, the method comprising:

receiving at the access permission server, during the initial creation of the electronic access permission, a first mobile electronic device ID;

generating an ID associated with the electronic access permission;

associating the ID of the electronic access permission with the unique ID of the first mobile electronic device;

transferring the electronic access permission to the first mobile electronic device for management in the mobile device application in response to associating the first mobile electronic device ID with the ID of the electronic access permission;

enabling a transfer of the electronic access permission from the first mobile electronic device, the unique ID of which is associated with the ID of the electronic access permission, to a second mobile electronic device; and following transfer of the electronic access permission to the first mobile electronic device, processing a transfer request for transferring the electronic access permission from the first mobile electronic device to the second mobile electronic device if transfer has been enabled, the processing comprising:

receiving, from the first mobile electronic device, first verification information associated at least with approval by the first mobile electronic device to transfer the electronic access permission;

receiving a request for the electronic access permission from the second mobile electronic device in response to the second mobile electronic device receiving the ID of the electronic access permission from the first mobile electronic device, wherein the request includes a unique ID of the second mobile electronic device;

verifying at the access permission server that the ID of the electronic access permission is associated with the unique ID of a mobile electronic device different than the second mobile electronic device;

requesting by the access permission server that the second mobile electronic device provide second verification information associated with transfer approval by the first mobile electronic device;

determining that the second verification information provided by the second mobile electronic device is validated in comparison to the first mobile electronic device;

in response to validating the second verification information from the second mobile electronic device, associating the ID of the electronic access permission with the unique ID of the second mobile electronic device;

transferring the electronic access permission to the second mobile electronic device for management through a mobile device application of the second mobile electronic device; and invalidating the electronic access permission for the first mobile electronic device in the access permission server by deleting the association between the electronic access permission ID and the first mobile electronic device ID.

12. The method of claim 11, wherein the first verification information comprises one or more of a password or authentication data specified by a user of the first mobile electronic device during creation of the electronic access permission.

13. The method of claim 11, wherein the second verification information comprises information associated with the unique ID of the second mobile electronic device.

14. The method of claim 11, wherein the initial creation of the electronic access permission further comprises defining a maximum transfer threshold indicating the total permitted number of times that the electronic access permission may be transferred to any mobile electronic device after initial creation.

15. The method of claim 14, wherein transferring the electronic access permission to any mobile electronic device after initial creation further comprises increasing a transfer count in the access permission server.

16. The method of claim 15, wherein processing the transfer request further comprises the step of permitting transfer only if the transfer count has not already equaled the pre-defined maximum transfer threshold.

17. The method of claim 14, wherein transferring the electronic access permission to any mobile electronic device further comprises appending the unique ID of the receiving mobile electronic device to a record of all mobile electronic device IDs receiving the electronic access permission since initial creation;

and wherein processing the transfer request further comprises the steps of determining from the record the number of times the electronic access permission has been transferred since initial creation and permitting transfer only if the determined count has not reached the maximum transfer threshold.

18. The method of claim 11, wherein the transfer of any mobile electronic device unique ID is via the mobile application of the mobile electronic device.

19. The method of claim 11, wherein the invalidation message from the access permission server is transferred to the mobile device application of the first mobile electronic device.

20. The method of claim 11, wherein the access permission server sends a message to the mobile applications of the first and second mobile electronic devices indicating a result of the processing of the transfer request.

* * * * *